US007442309B2

(12) United States Patent
Wilf et al.

(10) Patent No.: US 7,442,309 B2
(45) Date of Patent: Oct. 28, 2008

(54) METHODS FOR REDUCING BORON CONCENTRATION IN HIGH SALINITY LIQUID

(75) Inventors: Mark Wilf, San Diego, CA (US); Craig R. Bartels, San Diego, CA (US); Masahiko Hirose, Shiga (JP)

(73) Assignee: Hydranautics, Oceanside, CA (US)

( * ) Notice: Subject to any disclaimer, the term of this patent is extended or adjusted under 35 U.S.C. 154(b) by 554 days.

(21) Appl. No.: 10/460,697

(22) Filed: Jun. 12, 2003

(65) Prior Publication Data

US 2004/0065617 A1 Apr. 8, 2004

Related U.S. Application Data

(63) Continuation-in-part of application No. 10/188,476, filed on Jul. 3, 2002.

(60) Provisional application No. 60/388,256, filed on Jun. 13, 2002, provisional application No. 60/443,363, filed on Jan. 29, 2003.

(51) Int. Cl.
*B01D 61/00* (2006.01)
*B01D 15/00* (2006.01)
*B01D 21/00* (2006.01)

(52) U.S. Cl. .................. 210/652; 210/650; 210/651; 210/639; 210/641; 210/724

(58) Field of Classification Search ......... 210/650–652, 210/641, 257.2, 195.2, 500.38, 639, 500.39, 210/724
See application file for complete search history.

(56) References Cited

U.S. PATENT DOCUMENTS

| | | | |
|---|---|---|---|
| 3,953,580 A | 4/1976 | Allen et al. | |
| 4,366,062 A | 12/1982 | Kurihara et al. | |
| 4,755,298 A | 7/1988 | Grinstead | |
| 5,250,185 A | 10/1993 | Tao et al. | |
| 5,876,602 A | 3/1999 | Jons et al. | |
| 5,925,255 A * | 7/1999 | Mukhopadhyay | 210/652 |
| 6,054,050 A * | 4/2000 | Dyke | 210/639 |
| 6,120,689 A | 9/2000 | Tonelli et al. | |
| 6,267,891 B1 * | 7/2001 | Tonelli et al. | 210/652 |
| 6,375,842 B1 * | 4/2002 | Graham | 210/321.74 |
| 6,398,865 B1 * | 6/2002 | Morita et al. | 106/806 |
| 6,508,936 B1 | 1/2003 | Hassan | |
| 6,709,590 B1 * | 3/2004 | Hirose | 210/500.38 |
| 6,805,796 B2 * | 10/2004 | Hirose et al. | 210/321.76 |
| 6,821,430 B2 * | 11/2004 | Andou et al. | 210/636 |
| 7,097,769 B2 * | 8/2006 | Liberman et al. | 210/652 |
| 7,279,097 B2 * | 10/2007 | Tomioka et al. | 210/500.38 |
| 7,368,058 B2 * | 5/2008 | Nishikawa et al. | 210/652 |
| 2002/0108900 A1 * | 8/2002 | Hirose et al. | 210/321.74 |
| 2003/0230531 A1 * | 12/2003 | Wilf et al. | 210/639 |
| 2004/0065617 A1 * | 4/2004 | Wilf et al. | 210/652 |
| 2008/0035565 A1 * | 2/2008 | Enric et al. | 210/639 |

FOREIGN PATENT DOCUMENTS

| | | | | |
|---|---|---|---|---|
| FR | 2554732 | * | 7/1995 | |
| JP | 10085743 | * | 4/1998 | |
| JP | 10225682 | * | 8/1998 | |
| JP | 11138165 | * | 5/1999 | |
| JP | 11-197663 | * | 7/1999 | |
| JP | 2001269543 | * | 2/2001 | |
| JP | 02005246281 A | * | 9/2005 | |
| WO | WO 2005/056166 | * | 6/2005 | 210/652 |

OTHER PUBLICATIONS

Nadav, Nissim, Boron removal from seawater reverse osmosis permeate utilizing selective ion exchange resin, Desalination 124(1999) 131-135.*
Reverse Osmosis technology for waste water reuse, Mariñasa, b. J.; Waste Waer & Technology. vol. 24, No. 9, pp. 215-227, 1991.*
Magara et al., "Development of Boron Reduction System for Sea Water Desalination," *Desalination*, 118:25-34 (1998).
Prats et al. "Analysis of the influence of pH and Pressure on the Elimination of Boron in Reverse Osmosis," *Desalination*, 128:269-273 (2000).
Stumm et al. "An Introduction Emphasizing Chemical Equilibria in Natural Waters," *Aquatic Chemistry*, John Wiley & Sons, p. 207 (Apr. 1981).
Rodriguez et al. "Influence of pH in the Elimination of Boron by Means of Reverse Osmosis," *Desalination*, 140:145-152 (2001).
Glueckstern et al. "Advanced Concept of Large Seawater Desalination Systems for Israel," *Desalination*, 119:33-45 (1998).
Glueckstern et al. "The Impact of R&D on New Technologies, Novel Design Concepts and Advanced Operating Procedures on the Cost of Water Desalination," *Desalination*, 139:217-228 (2001).

* cited by examiner

*Primary Examiner*—Ana M Fortuna
(74) *Attorney, Agent, or Firm*—Panitch Schwarze Belisario & Nadel LLP

(57) ABSTRACT

Methods of treating a high salinity liquid, such as seawater, containing boron are provided, including adjusting the pH of the liquid to about 8 to about 9.5, optionally adding a scale inhibitor to the liquid, passing the liquid through a reverse osmosis device, and recovering a permeate having a boron concentration less than about 2 ppm. One embodiment includes removing colloidal matter from the liquid using a membrane filtration system, such as ultrafiltration or microfiltration, prior to passing the liquid through the reverse osmosis device, and preferably prior to adjusting the pH of the liquid.

20 Claims, No Drawings

US 7,442,309 B2

METHODS FOR REDUCING BORON CONCENTRATION IN HIGH SALINITY LIQUID

CROSS-REFERENCE TO RELATED APPLICATIONS

This application claims the benefit of U.S. Provisional Application No. 60/388,256, filed Jun. 13, 2002, and U.S. Provisional Application No. 60/443,363, filed Jan. 29, 2003, and is a continuation-in-part of co-pending application Ser. No. 10/188,476, filed Jul. 3, 2002, the disclosures of which are incorporated herein by reference.

BACKGROUND OF THE INVENTION

Seawater typically contains about 4 to 7 ppm boron, in addition to a variety of water-soluble salts. Traditional methods for purifying (desalinating) seawater for drinking and irrigation purposes utilize reverse osmosis (RO) membranes, which are effective at significantly reducing the concentrations of all dissolved ions in the seawater. Although the reduction of the majority of dissolved ions by polyamide reverse osmosis membranes is about 98% to about 99%, the rejection rate of boron by these membranes is much lower, typically in the 70%-90% range, and may be even lower at high feed water temperatures (greater than about 25° C.).

The significantly lower rejection rate of boron by polyamide membranes may be explained by the very low dissociation rate of boric species at neutral pH. However, this boric species dissociation rate increases with pH and reaches 50% dissociation at a pH of 8.6 to 9.8, depending on the ionic strength of the solution and the temperature (W. Stumm, et al. *Aquatic Chemistry,* John Wiley & Sons (1981)). Consequently, an increased boron rejection rate is achievable at high pH, thus making possible appreciable reduction of boron concentration by reverse osmosis.

Magara et al. (*Desalination* 118:25-34 (1998)) and Prats et al. (*Desalination* 128: 269-273 (2000)) describe methods for reducing boron concentration using two-pass reverse osmosis systems. In these systems, the pH of the permeate from the first pass is increased before it is passed through the RO membrane in the second pass in order to improve the boron rejection. The term "permeate" is known in the art to refer to reverse osmosis product water. Because the RO permeate from these systems has low salinity and low concentration of scale-forming ions, even adjustment of the pH to high levels does not result in scale formation.

An example of a similar methodology applied to high salinity water is described by Tao et al. (U.S. Pat. No. 5,250,185), which involves the application of a high pH RO processing method to oilfield-produced water. In order to prevent scaling of the reverse osmosis system by carbonate salts, the feed water is softened prior to adjustment of the pH to a level greater than 9.5. Tao et al. teach that the high pH is necessary to obtain the desired increase in boron rejection. Additionally, Mukhopadhyay (U.S. Pat. No. 5,925,255) describes the treatment of brackish and low salinity water by reverse osmosis, in which the hardness of the RO feed water is removed by a weak acid cation exchange resin.

Surface seawater filtration processes typically involve in-line flocculation followed by media filtration. It has been found that for efficient flocculation using ferric flocculent, the pH of seawater should be maintained at about 7, which is below the typical native pH of about 7.8 to 8.2, since higher pH levels may have an adverse effect on the effectiveness of media filtration with flocculation of seawater. Effective flocculation may be desired prior to media filtration to provide efficient removal of colloidal material from the RO feed water and prevent RO membrane fouling.

One possible solution would be to initially reduce the pH of the seawater from about 7.8-8.2 to about 7, add flocculent, and then pass the seawater through the media filters. After media filtration and before RO processing, the pH of the filter effluent could be increased to about 8 to 9.5 to increase boron rejection by RO membranes. Such an approach would result in both effective filtration of feed water and higher boron rejection by RO membranes. However, the use of acid for pH reduction, followed by caustic for acid neutralization, would result in additional operating costs.

Systems using membrane technology, such as ultrafiltration (UF) or microfiltration (MF), for pretreating feed water prior to RO are known. For a example, a system configuration called Integrated Membrane System (IMS) produces feed water of superior quality with respect to suspended solids. Such integrated systems contain two different types of membranes which are functionally connected; the pretreatment section may use either MF or UF membranes. The IMS configuration has been tested extensively as a pretreatment for RO systems. For example, Glueckstern et al. (*Proceedings of ICOM Conference,* Toulouse, 2002) describe the reduction of colloidal matter in seawater prior to RO using parallel operation of ultrafiltration and media filtration systems. Similar quality of seawater effluent was obtained during operation of the two types of systems during periods of average water quality. However, during periods of stormy weather, media filters could not cope with the increasing load of suspended matter. In contrast, the ultrafiltration system produced good quality effluent, suitable for RO, regardless of the quality of the raw water.

It would be desirable to be able to significantly reduce the concentration of boron in high salinity liquids in straightforward processes that would be attractive due to lower operating costs and superior effectiveness relative to known methods.

SUMMARY OF THE INVENTION

According to the present invention, methods for reducing boron concentration in a high salinity boron-containing liquid are provided. A first embodiment of the invention comprises adjusting the pH of the liquid to about 8 to about 9.5, passing the liquid through a reverse osmosis device, and recovering a permeate having a boron concentration of less than about 2 ppm.

A second embodiment of the invention comprises treating the high salinity liquid with a membrane filtration system to remove at least one suspended solid from the liquid; adjusting a pH of the high salinity liquid to about 8 to about 9.5; passing the liquid through a reverse osmosis device; and recovering a permeate having a boron concentration of less than about 2 ppm.

DETAILED DESCRIPTION OF THE INVENTION

The present invention is directed to methods for reducing the concentration of boron in high-salinity boron-containing liquids such as seawater, in which the resulting treated water, or permeate, has a substantially decreased boron concentration.

More specifically, one embodiment provided by the invention comprises adjusting the pH of the high salinity liquid to an appropriate high level, passing the high salinity liquid through a reverse osmosis device, and recovering a permeate having a reduced boron concentration of less than about 2 ppm of boron. In a preferred embodiment, the permeate has a reduced boron concentration of less than about 1 ppm, and most preferably less than about 0.5 ppm.

The term "high salinity liquid" may be understood to mean any liquid having a salt content of at least about 2000 ppm of total dissolved salts (TDS), and more preferably greater than about 10,000 ppm TDS. In one embodiment, the high salinity, boron-containing liquid is seawater, which typically has a TDS of about 32,000 to 44,000 ppm, but any high salinity liquid which contains boron may be treated by the method of the invention. The presently preferred method of measuring the boron concentration is ICAP (ion Coupled Argon Plasma). However, boron determination may be accomplished by any technique know to those in the art.

It is preferred to adjust the pH of the high salinity liquid to about 8 to about 9.5, and more preferably to about 8 to about 9.3. As previously described, literature reports have shown that boron rejection can be greatly enhanced by raising the pH to high levels, such as greater than 9.5. However, under such conditions, softening of the water is also necessary. Because high pH levels may result in calcium scaling, typical RO plants are operated at pH levels of 8.2 or even less, such as about 7.8, to ensure the absence of calcium scale formation. In contrast, the first embodiment according to the present invention is advantageous because it does not require pre-softening of the water and results in substantially higher boron rejection by operating the reverse osmosis system at pH levels of about 8 to about 9.5, slightly higher than normal.

According to the present invention, the pH is preferably adjusted by treating the high salinity liquid with a base such as the preferred sodium hydroxide or calcium hydroxide. Other common bases, such as lime (calcium oxide), may also be used. Even if the pH of the high salinity liquid is initially greater than about 8, it may be desirable for some applications to raise the pH to the upper end of the desired range: closer to about 9.5.

In a preferred embodiment, both the measurement and adjustment of the pH are performed in-line while the high salinity liquid flows. Following determination of the pH, a dosing pump, which is fed from a tank, injects the base into the in-line fluid. Ideally, the dosing pump has automatic feedback which automatically monitors and controls the amount of base which is added. No mixing is required because the base is mixed naturally with the high salinity liquid as it flows.

Following adjustment of the pH of the high salinity liquid, the liquid is passed through a reverse osmosis device, which is preferably a pressure vessel. In one embodiment, the reverse osmosis device comprises an array or set of filter elements arranged in a series and parallel configuration to achieve a given treated water recovery requirement. The array contains reverse osmosis membrane elements which are preferably polyamide type membranes having slight or excessive negatively charged surfaces. Other negatively charged separation membranes, such as polyacrylic acid, may also be used. The membrane elements may be arranged in a variety of packing configurations, such as a plate and frame module or a hollow fiber module, and more preferably a spiral wound configuration. Typical spiral wound reverse osmosis membrane elements which are commercially available are 4"×40" or 8"×40" (approximately 10×102 cm or 20×102 cm), but any membrane configuration or dimension known in the art would be applicable for the methods of the invention. Typically, pressure devices comprise about 6 to about 8 membrane elements, but under some circumstances, it may be desirable to use fewer membranes in the pressure device.

The liquid may be passed through the RO device at ambient temperature or at slightly reduced or slightly elevated temperatures. More particularly, the method would be effective at a normal temperature range for the membranes of about 1° C. to about 45° C. It is not believed that the effect of pH on boron removal is significantly affected by changes in temperature. However, while the method may be performed at temperatures below about 20° C., RO membranes are inherently more effective at rejecting boron at these lower temperatures and the pH adjustment step may not be needed. The method may be performed at normal operating pressures of a reverse osmosis membrane such as about 800 to about 1500 psi (about $5\times10^6$ to $10\times10^6$ Pa), more preferably about 800 to about 1200 psi (about $5\times10^6$ to $8\times10^6$ Pa), and most preferably about 900 to about 1000 psi (about $6\times10^6$ to $7\times10^6$ Pa). In an exemplary method, saline water is provided at about 12 to about 75 gpm (about 3 to 17 $m^3$/hour) for an 8 inch diameter by 40 inch (about 20×102 cm) long element.

In one embodiment, the method further comprises adding a scale inhibitor to the high salinity liquid before passing the water through the RO device in order to prevent the formation of carbonate or other hardness scales in the membranes, which typically occurs at high pH. The anti-scalant may be any commercial scale inhibitor known in the art to control calcium carbonate scaling or magnesium hydroxide scaling. A preferred dosage of scale inhibitor is about 0.5 to about 5 ppm. However, there is a limit to the effectiveness of scale inhibitors. In particular, if the pH is greater than about 9.5, it is likely that an anti-scalant may not be able to delay or inhibit scale formation. In the present method, the pH is controlled to be about 8 to about 9.5, and thus no scale formation occurs when a scale inhibitor is added.

After the liquid is passed through the first pass RO device, the permeate that is recovered has a reduced boron concentration of less than about 2 ppm, more preferably less than about 1 ppm, and most preferably less than about 0.5 ppm. The permeate also has reduced concentrations of all soluble salt ions, such as sodium, magnesium, and chloride. The permeate from the first pass membrane elements, which is low in boron, may be used as is, or may be treated further by an additional membrane process, such as membrane, ion exchange, distillation or other boron reducing process to further lower the boron concentration. Because the feed water for the second pass RO system has lower salinity, the second pass system can be operated at lower pressures and use less energy. In other words, the size of the second treatment system may be minimized by operating the first pass of membrane elements at the high end of the pH range to produce a lower boron concentration permeate. The reduction in the size of the second pass RO system thus results in cost savings.

A second embodiment according to the invention comprises using a membrane pretreatment filtration system, preferably ultrafiltration or microfiltration technology, to effectively remove colloidal particles from the boron-containing liquid at native pH. For example, the native pH of seawater is typically about 7.8 to 8.2. Optionally, at least one coagulant chemical may be added to the high salinity liquid prior to membrane pretreatment. Following the ultrafiltration or microfiltration step, the method comprises adjusting the pH of the high salinity liquid to an appropriate high level, optionally adding a scale inhibitor, passing the high salinity liquid through a reverse osmosis device, and recovering a permeate having a reduced boron concentration of less than about 2 ppm of boron. In a preferred embodiment, the permeate has a reduced boron concentration of less than about 1 ppm, and most preferably less than about 0.5 ppm. The use of membrane pretreatment to remove colloidal particles prior to RO is performed in place of traditional or conventional flocculation and media filtration steps. This membrane pretreatment is advantageous because it is more economical than conventional filtration, and further does not require pH reduction, necessary with flocculation and media filtration, as previously described.

The membrane pretreatment in the method of the invention preferably involves passing the high salinity liquid at native pH through an ultrafiltration or microfiltration system to produce an effluent which has a substantially reduced concentration of colloidal particles. In a preferred embodiment, the concentration in the effluent of particles having a diameter less than or equal to about 1 micron is less than about 5 particles/ml. Since both UF and MF systems produce water of similar quality, the selection of the particular technology may be determined based on process economics. It is preferred that the UF or MF system comprise UF or MF membrane modules and utilize spiral wound membrane elements, more preferably capillary type modules capable of operating in direct (dead end) filtration mode.

In a preferred embodiment, the method of the invention is performed in an Integrated Membrane System, which contains both a pretreatment system utilizing MF or UF membrane technology and a RO desalination unit. Although such integrated systems may be more expensive than two separate systems, they provide more reliable feed water supply and a more consistent quality of the feed water.

Membrane pretreatment utilizes membrane separation processes to filter feed water and remove suspended particles. In contrast, traditional flocculation and media filtration remove suspended particles using a layer of sand, which has been found to be less effective than membrane pretreatment in removing small colloidal particles. In a typical IMS, the first membrane system operates at very low pressure (such as about 3 to 15 psi) (about $2 \times 10^4$ to $1 \times 10^5$ Pa) or under vacuum, and removes only suspended matter; dissolved ions pass through. In the second system, the RO system, which operates at high pressure (typically over about 800 psi) (about $5 \times 10^6$ Pa), the effluent of the first system is processed and the concentration of dissolved ions is reduced.

In one embodiment, a small amount of at least one coagulant chemical may be added to enhance the UF or MF process. The need for such a coagulant and the desired amount may be determined based on experimentation. The coagulant may be mixed with the seawater in a separate mixing chamber or added in-line. For example, coagulants such as ferric chloride, aluminum sulfate, polyaluminum chloride, and others known to those in the art or to be discovered would effectively increase the size of the colloidal solids in the feed water to make them more efficiently removable by the UF or MF membrane process by improving the performance stability of the permeability rate of the UF or MF process. In contrast, in media filtration systems, flocculant coalesces colloidal particles and improves their removal rate.

As in the first embodiment of the invention, it is preferred to adjust the pH of the high salinity UF or MF effluent to about 8 to about 9.5, and more preferably to about 8 to about 9.3. This embodiment is also advantageous because it does not require pre-softening of the water and results in substantially higher boron rejection by operating the reverse osmosis system at pH levels of about 8 to about 9.5, slightly higher than normal.

The pH of the effluent is preferably adjusted by treatment with a base, using the methods and materials as previously described with respect to the first embodiment of the invention.

Following adjustment of the pH of the effluent, the liquid is passed through a reverse osmosis device, which is preferably a pressure vessel. The number and nature of the possible and preferred RO elements in the pressure vessel have been previously described.

As in the first embodiment of the invention, the effluent may be passed through the RO device at ambient temperature or at slightly reduced or slightly elevated temperatures and would be effective at the normal temperature range for the membranes of about 10° C. to about 45° C. The embodiment is typically performed at normal operating pressures of a reverse osmosis membrane, as previously explained.

In another embodiment, the method further comprises adding a scale inhibitor to the high salinity liquid after the membrane pretreatment before passing the effluent through the RO device in order to prevent the formation of carbonate or other hardness scales in the membranes, which typically occurs at high pH. As in the first embodiment of the invention, the anti-scalant may be any commercial scale inhibitor known in the art to control calcium carbonate scaling or magnesium hydroxide scaling. A preferred dosage of scale inhibitor is about 0.5 to about 5 ppm. In the present embodiment, the pH is controlled to be about 8 to about 9.5, and thus no scale formation occurs when a scale inhibitor is added.

After the liquid is passed through the first pass RO device, the permeate that is recovered has a reduced boron concentration of less than about 2 ppm, more preferably less than about 1 ppm, and most preferably less than about 0.5 ppm. The permeate also has reduced concentrations of all soluble salt ions, such as sodium, magnesium and chloride. The permeate from the first pass membrane elements, which is low in boron, may be used as is, or may be treated further by an additional membrane process, such as membrane, ion exchange, distillation or other boron reducing process to further lower the boron concentration. As previously explained with respect to the first embodiment, because the feed water for the second pass RO system has lower salinity, the second pass system may be operated at lower pressures and use less energy, thus resulting in cost savings.

This invention will best be understood in connection with the following, specific, non-limiting examples.

COMPARATIVE EXAMPLE 1

A typical 8 inch (about 20 cm) pressure vessel was loaded with eight SWC3 spiral wound membrane elements, commercially available from Hydranautics, in series. The combined permeate from all eight elements could be collected from a common exit port from the pressure vessel. A sample of seawater was tested and found to have a pH of 8.14. Using ICAP (Ion Coupled Argon Plasma), the boron concentration of the seawater was determined to be 6.02 ppm. The seawater, at a temperature of 23.1° C., was introduced into the pressure vessel at a feed pressure of 1140 psi (about $7.9 \times 10^6$ Pa). The pressure vessel operated at a recovery rate of 50%. After passing through the pressure vessel, the permeate was analyzed and found to have a boron concentration of 1.27 ppm.

EXAMPLE 1

A second sample of seawater having a boron concentration of 5.89 ppm was treated with sodium hydroxide in-line to raise the pH to 9.24. Approximately 28 ppm of 100% NaOH were added to achieve a pH in the desired range. Approximately 4 ppm of a commercial anti-sealant was added to the liquid. The seawater, at a temperature of 23.4° C., was fed through the same pressure vessel as in Comparative Example 1. After passing through the pressure vessel, the permeate was analyzed and found to have a boron concentration of 0.48 ppm. The data from the two Examples are tabulated below.

| Example | Water Temp (° C.) | Water pH | Initial boron concentration (ppm) | Final boron concentration (ppm) |
|---------|-------------------|----------|-----------------------------------|---------------------------------|
| 1 | 23.1 | 8.14 | 6.02 | 1.27 |
| 2 | 23.4 | 9.24 | 5.89 | 0.48 |

These Examples demonstrate that the pH of the high salinity liquid has a significant effect on the final boron concentration in the permeate recovered from the reverse osmosis device. When the pH is about 8 to about 9.5, the boron concentration may be reduced to less than about 0.5 ppm.

In comparison with other methods known in the art for reducing boron concentration using reverse osmosis membranes, the present methods have the advantage of offering a significantly increased boron rejection rate in a seawater reverse osmosis membrane system using single pass configurations. This decrease in boron concentration is accomplished at an elevated pH which is low enough that in the presence of a scale inhibitor, no scale formation is observed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A desalination treatment method for high salinity, boron-containing liquid, including a method of reducing a boron concentration in the high salinity, boron-containing liquid, the boron reduction method consisting essentially of the following steps:
   (a) increasing a pH of a non-softened, high salinity liquid to about 8 to 9.5;
   (b) passing the pH-increased, non-softened, high salinity liquid through at least one reverse osmosis device; and
   (c) recovering a permeate from the at least one reverse osmosis device wherein the permeate has a boron concentration of less than about 2 ppm.

2. The method of claim 1, wherein the high salinity liquid is seawater.

3. The method of claim 2, wherein the seawater comprises about 4 to about 7 ppm of boron.

4. The method of claim 1, wherein the pH of the high salinity liquid is increased to about 8 to about 9.3.

5. The method of claim 1, wherein step (a) consists essentially of adding a base to the high salinity liquid.

6. The method of claim 5, wherein the base is selected from the group consisting of calcium hydroxide, sodium hydroxide and lime.

7. The method of claim 1, wherein the at least one reverse osmosis device comprises an array comprising at least one reverse osmosis membrane.

8. The method of claim 7, wherein the at least one reverse osmosis membrane is a polyamide-type membrane.

9. The method of claim 7, wherein the at least one reverse osmosis membrane is selected from the group consisting of a spiral wound membrane and a hollow fiber membrane.

10. The method of claim 1, wherein the desalination treatment method further comprises adding a scale inhibitor to the high salinity liquid before step (b).

11. The method of claim 1, wherein the permeate has a boron concentration of less than about 1 ppm.

12. The method of claim 11, wherein the permeate has a boron concentration of less than about 0.5 ppm.

13. The method of claim 1, wherein the desalination treatment method further comprises at least before step (a) treating the high salinity liquid with a membrane filtration system to remove at least one suspended solid from the liquid.

14. The method of claim 13, wherein the membrane filtration system is selected from the group consisting of an ultrafiltration system and a microfiltration system.

15. The method of claim 14, wherein the membrane filtration system comprises a membrane module selected from the group consisting of an ultrafiltration membrane module and a microfiltration membrane module.

16. The method of claim 15, wherein the ultrafiltration or microfiltration membrane module comprises a membrane selected from the group consisting of spiral wound and capillary type membranes.

17. The method according to claim 1, wherein the pH of the high salinity liquid is increased to about 8.5 to 9.5 in step (a)

18. The method according to claim 17, wherein the pH of the high salinity liquid is increased to about 8.5 to about 9.3.

19. The method according to claim 1, wherein the at least one reverse osmosis device is a high pressure reverse osmosis device.

20. The method according to claim 1, wherein step (b) consists essentially of passing the pH-increased, non-softened, high salinity liquid through two reverse osmosis devices.

* * * * *